May 8, 1956   B. L. CLEAVELAND ET AL   2,744,372
ARTICLE HANDLING DEVICE
Filed Aug. 2, 1955   7 Sheets-Sheet 4
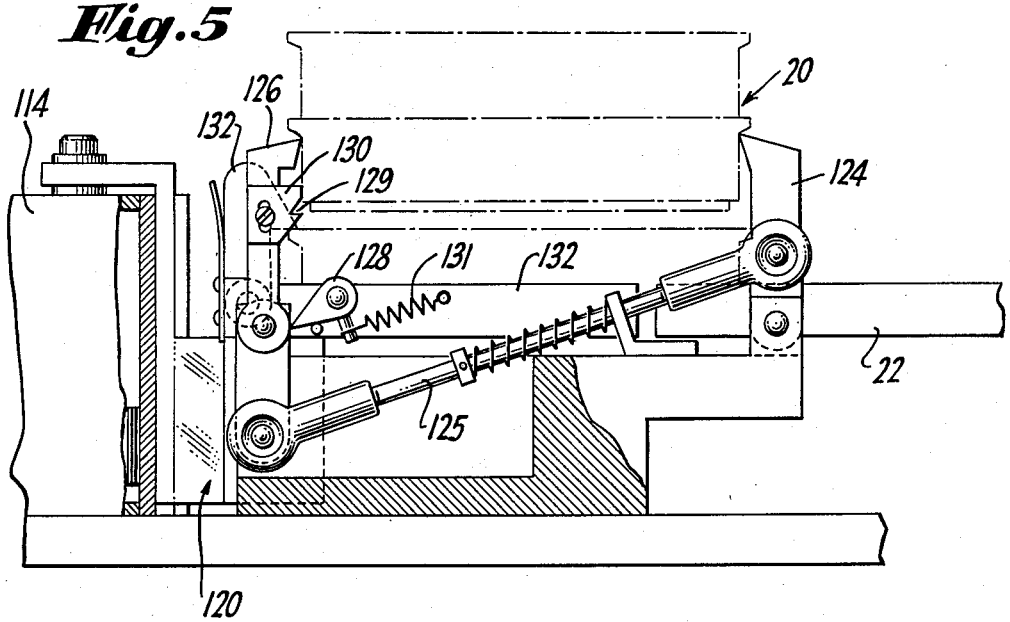
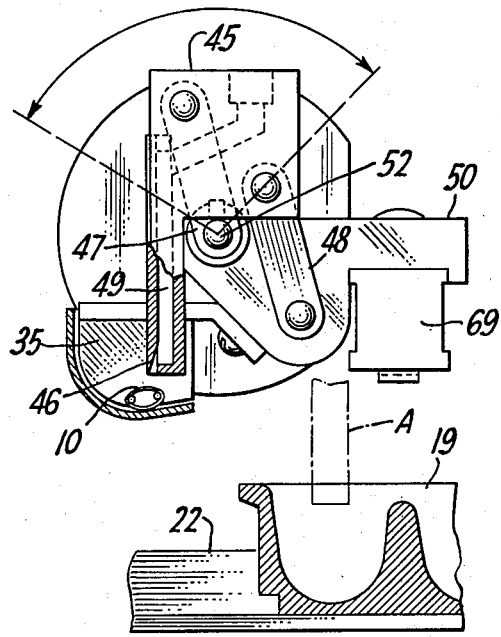
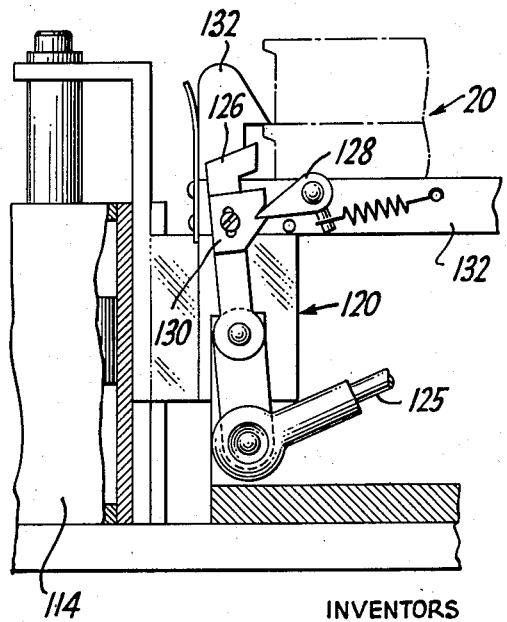
INVENTORS
BURTON L. CLEAVELAND
GILBERT A. LARSON
RALPH A. ENGLERT
BY
ATTORNEY

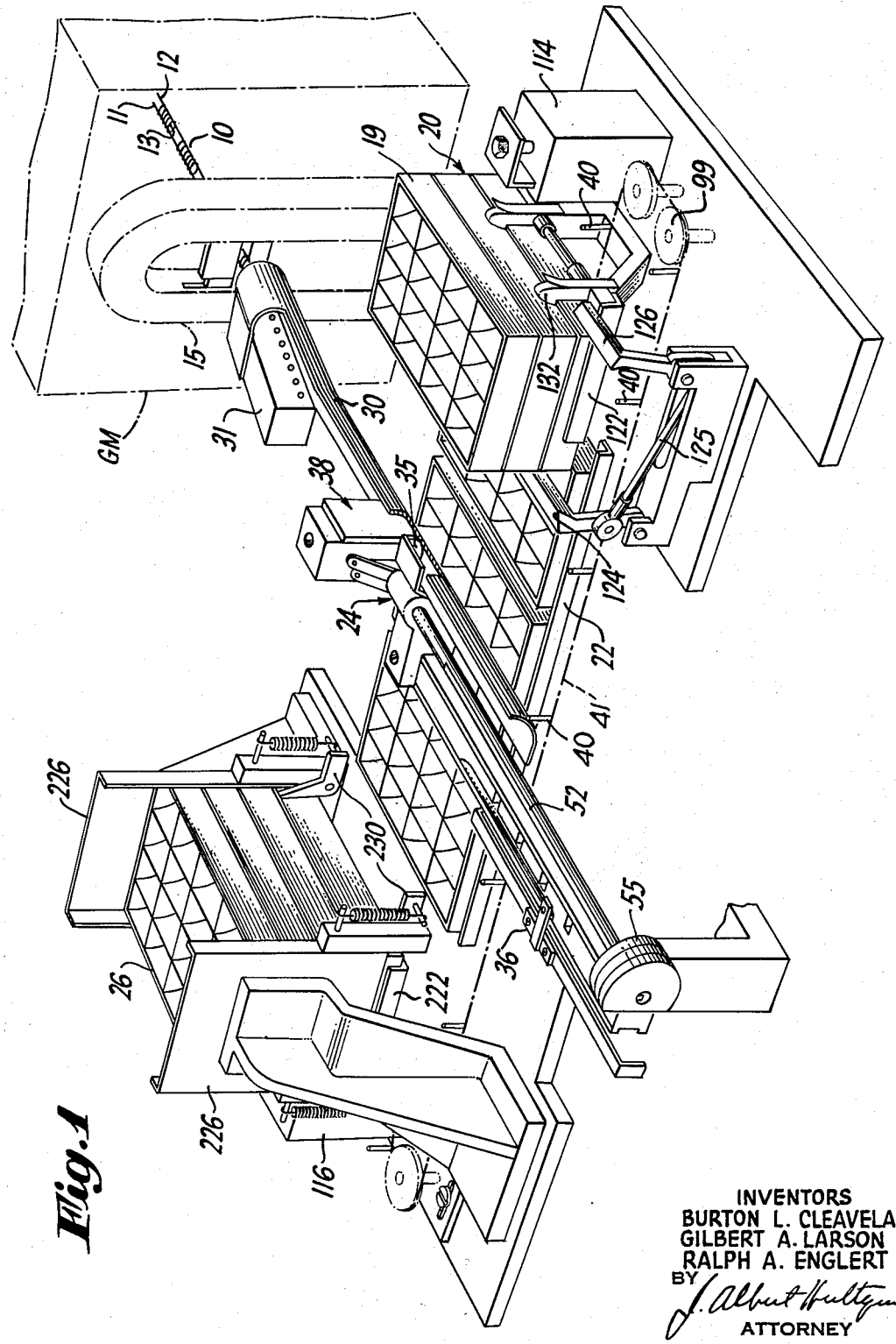

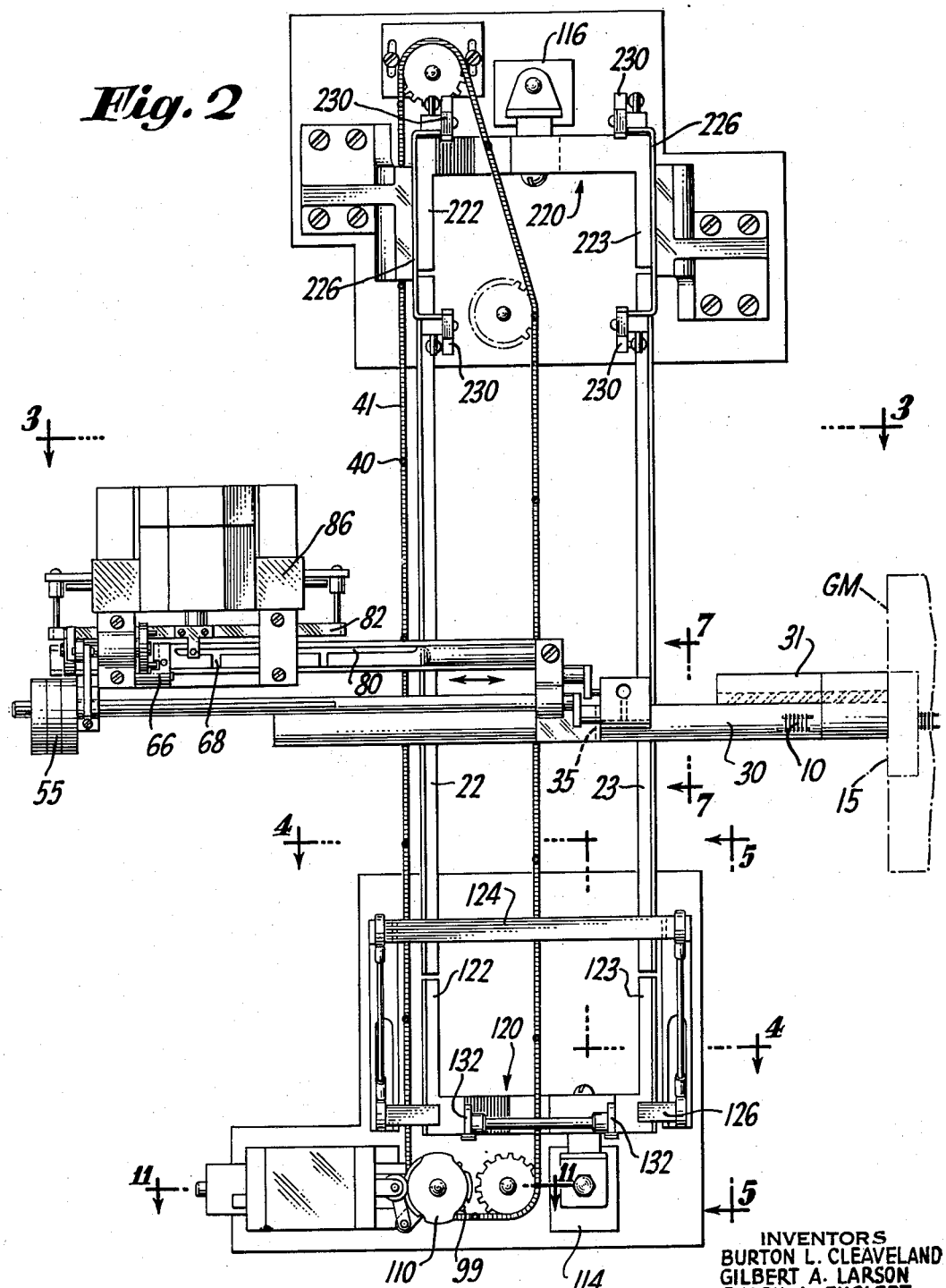

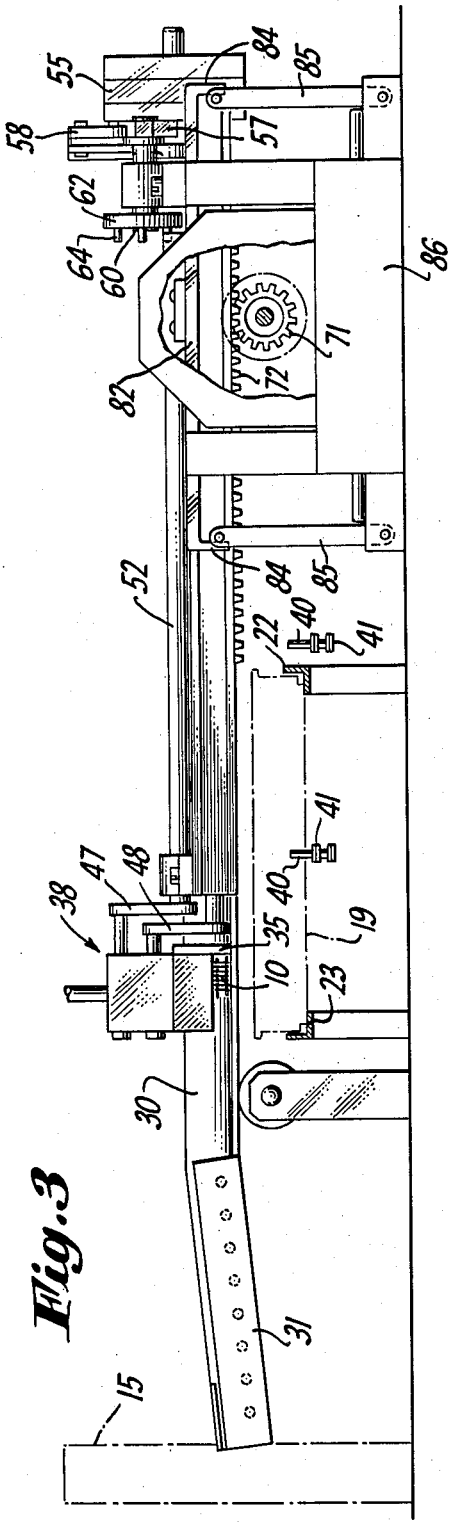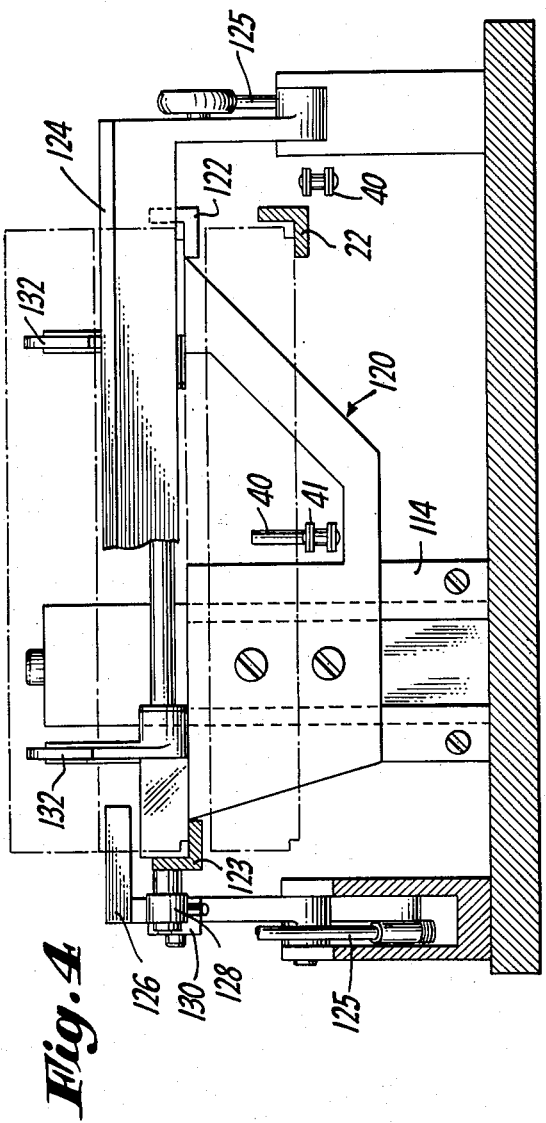

INVENTORS
BURTON L. CLEAVELAND
GILBERT A. LARSON
RALPH A. ENGLERT
ATTORNEY

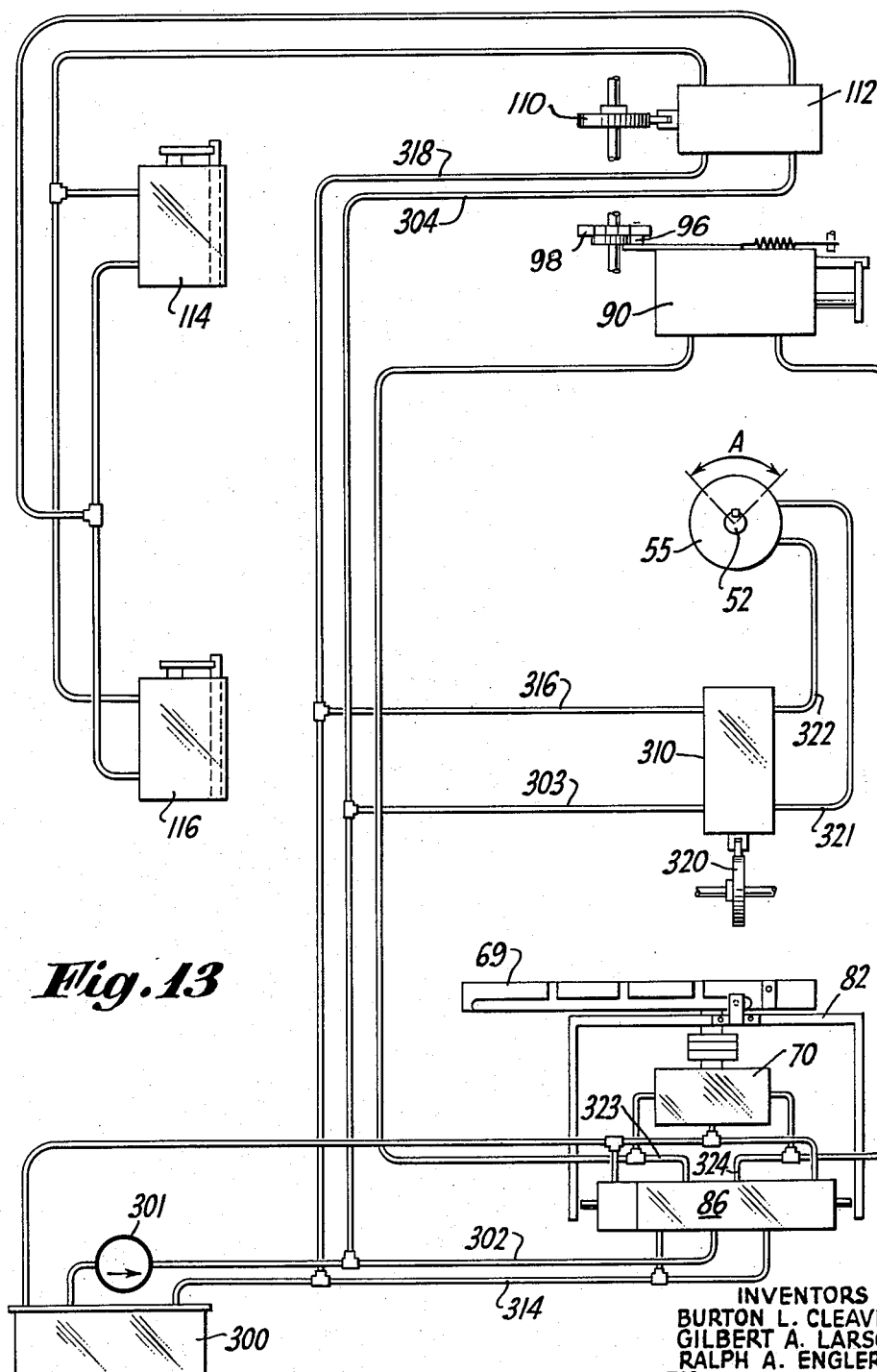

United States Patent Office 2,744,372
Patented May 8, 1956

2,744,372
ARTICLE HANDLING DEVICE

Burton L. Cleaveland, Fern Creek, Ky., and Ralph A. Englert, Montoursville, and Gilbert A. Larson, Emporium, Pa., assignors to Sylvania Electric Products, Inc., a corporation of Massachusetts Continuation of application Serial No. 129,414, November 25, 1949. This application August 2, 1955, Serial No. 525,847

26 Claims. (Cl. 53—246)

The present invention relates to article handling devices and more particularly to a machine for receiving small, fragile work pieces from a source of such articles, and placing them in a regular array in a tray for storage or as a source of supply of said pieces for further operations to be performed on them.

An object of the present invention is to facilitate the handling of fragile work pieces.

Another object of the present invention is the provision of a machine for receiving fragile articles such as radio tube grids from a winding machine for said grids and for placing said grids in a regular array in a storage tray.

Another object of the present invention is the provision of a machine for receiving grids from a grid winding machine and placing them in regular array in a storage tray, and further for stacking said storage trays in uniform stacks.

The foregoing objects, and others which may appear from the following detailed description, are attained in accordance with an aspect of the present invention by providing a track system adapted to move a series of trays one at a time in regular succession from one vertical stack of trays and deliver them to another vertical stack of trays. Each tray is preferably provided with a number of rows of pockets into which grids wound by a grid winding machine with which the device is associated, are to be placed. As each tray passes under an intermediate station, between the two stacks of trays, grids received from the winding machine and passing along a chute are transferred individually to pockets in the tray. The grids are carried along the delivery chute by a blast of compressed air until they strike against a stop in the chute. This machine is provided with a suction head member which picks up each grid as it strikes the stop and transfers it to one of the pockets of the tray beneath the head member. One grid is deposited at a time, and this occurs in timed relation to the discharge of grids from the winding machine. Either a single grid or a plurality up to 20 may be deposited in each pocket of the tray. As each pocket in a tray is filled, the suction head and the stop advance so that a like number of grids is deposited into the next pocket of the same row. When the entire row has been filled the traverse of the stop is reversed and the tray is shifted so that the grids are deposited in pockets of the next row. This operation continues until the tray has been filled with a predetermined number of grids in each pocket. The next shift of the trays places the first row in the next tray in position to receive grids, clears a space in the track for a new tray to drop from the delivery stack and places a filled tray in the receiving stack.

The present invention will be more fully understood by reference to the following detailed description which is accompanied by a drawing in which Figure 1 illustrates in perspective view an embodiment of the present invention associated with a grid winding machine only part of which is indicated.

Figure 2 illustrates in plan view the embodiment of Figure 1 while

Figure 3 is an elevational view partly in section taken along line 3—3 of Figure 2.

Figure 4 is a view taken along the line 4—4 of Figure 2 showing details of the tray releasing mechanism, while Figure 5 is an elevation view taken in the direction of arrows 5—5 of Figure 2 and partly in section showing details of the filled tray stacking mechanism.

Figure 6 is a detail taken from Figure 5 with the escapement mechanism in another operating position.

Figure 7 is a view taken along line 7—7 of Figure 2 showing the operation of the grid transferring head while

Figure 11 is an enlarged view in the direction of arrows 11—11 of Figure 2 showing the indexing chain drive mechanism for moving the trays from one stack to the other while Figure 13 is a hydraulic circuit diagram illustrating the connections which operate the various hydraulic motors of the present embodiment of the invention.

Figure 8:
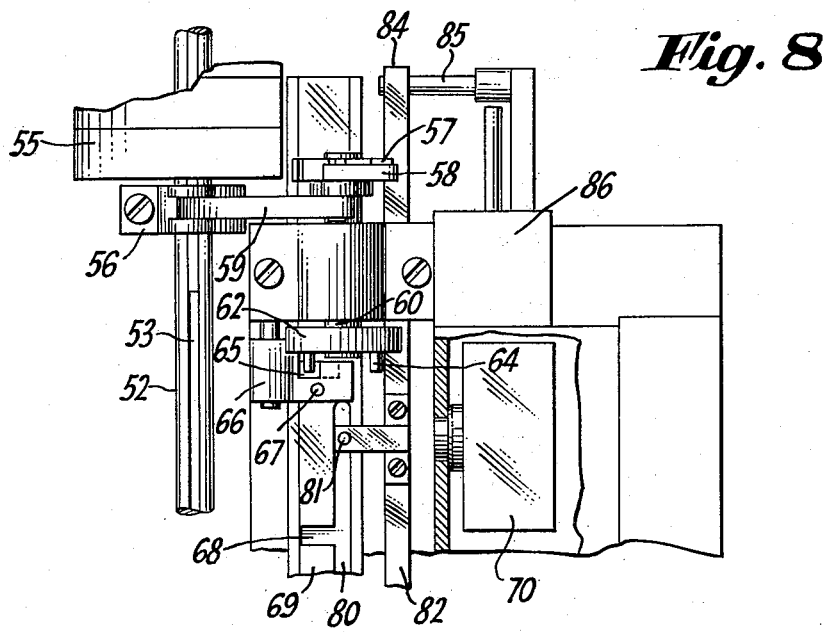
Figure 8 is a fragmentary plan view of the escapement and operating mechanism for the grid transfer head.

Reference will now be had to Figure 1 which illustrates in a perspective view, with certain portions removed for clarity, an embodiment of the present invention and associated therewith a fragmentary showing of a grid winding machine of the type with which the present arrangement is adapted to operate.

For the purposes of the present disclosure it is believed sufficient to say that the grid winding machine GM winds a continuous series of grids as indicated at 10. Each grid includes a pair of side rods 11 and 12 and a spaced open winding of grid lateral wire 13. The individual grids are separated by short spaces wherein only the side rods 11 and 12 exist, and the final operation of forming the grids takes place at a cutting head 15, wherein the side rods 11 and 12 are severed to produce a number of individual grids.

A grid winding machine of this type is disclosed in Application No. 771,995 filed September 3, 1947, by Stanley J. Gartner and assigned to the assignee of the present application. Reference may be had to said application for a more complete disclosure of the operating principles but it is believed that sufficient detail is given here for an understanding of so much of the grid winding machine as is necessary for understanding the present invention.

In previous practice it has been customary in operating such grid winding machines to provide a position at the delivery end of the grid winding machine for an operator with a pair of tweezers to pick up the grids one at a time from a delivery tray and place them in transfer or storage trays. However, in the present arrangement a stack of grid storage trays 19 is provided at 20. Trays 19 are shallow rectangular metal boxes having a number of rows of individual pockets on their interior. The trays are provided with a reduced lower margin or are tapered so that they may be stacked one above the other in a stable column. Trays 19 are held in place in stack 20 by a detent mechanism to be later described and lowered one at a time as the occasion requires, on to a pair of rails 22, 23. The trays 19 are intermittently moved in a stepwise manner along the rails under a loading station 24, and after being filled are eventually moved to a receiving rack 26 where the filled trays are stacked one beneath the other. At intervals as the occasion may require the filled stacks are removed from stack 26 and either immediately forwarded to further manufacturing operations or temporarily placed in storage until the grids are needed. As each filled tray 19 is completely aligned with the bottom of stack 26, a pickup mechanism lifts the stack of trays upwardly to provide room for the entry of the following tray beneath stack 26.

At the loading station the individual grids 10 after being severed by the cutting mechanism 15 drop into the chute 30. They are propelled along chute 30 by a blast of air from air head 31 until they strike the movable stop 35. Head 38 operating in synchronism with the cutting mechanism 15 picks up each grid as it arrives at stop 35 and transfers it into the pocket of the tray 19 which is at its discharge position. After each pocket has received a predetermined number of grids, be it 1 or 20, an indexing mechanism 36, which will be described in detail later, shifts the stop 35 so as to be in alignment with the next pocket in each row of the tray. The transfer head 38 moves with stop 35 so as always to remain in the same relative position with respect to the stop.

After one row in a tray is completely filled the indexing mechanism 36 reverses in its motion so as to travel the other direction along the next row of pockets in tray 19 and at the same time the intermittent propelling mechanism for the trays 19 is actuated so as to place a new row of pockets in position to receive grids discharged from head 38. The intermittent motion of trays 19 along track 22 is accomplished by means of pins 40 on a chain 41 indicated schematically by a dotted line in Figure 1 by mechanism to be described later with reference to Figures 11, 12 and 13. Each pin 40 engages a tray 19 as it is lowered from stack 20 to a position in line with rails 22, and is disengaged therefrom when the filled tray is lifted into the receiving stack 26.

The mechanism for transferring separate grids 10 from the delivery chute 30 to the individual pockets in trays 19 will now be described with particular reference to Figures 2, 3, 7, 8, 9 and 10. The transferring mechanism includes a suction pickup head 45, Figure 7, carried by a parallel arm linkage 47, 48 on a longitudinally shiftable carriage arrangement 50. Transfer head or element 45 includes a narrow nozzle 46 coupled through an air passage 49 to a hose (not shown). The carriage also carries stop 35 along the length of chute 30. The transfer head is arranged to be operated from a position, as shown in solid lines in Figure 7, in chute 30 with nozzle 46 immediately in front of stop 35 to a position indicated in dotted lines at A, where the head is immediately over one of the pockets in tray 19. Suction is applied to passage 49 through the air hose so that the grid 10 is picked up and held against nozzle 46 when the pickup head is over chute 30. When the pickup head reaches position A, the suction is arranged to be shut off, so that the grid drops into the pocket of tray 19. The motion of pickup head 45 is provided by link 47 being keyed to a rotary shaft 52. The shaft 52 is provided with a keyway 53 (Fig. 8) along nearly its entire length, so that it may freely slide through, but still be rotated by hydraulic oscillatory motor 55.

Figure 9:
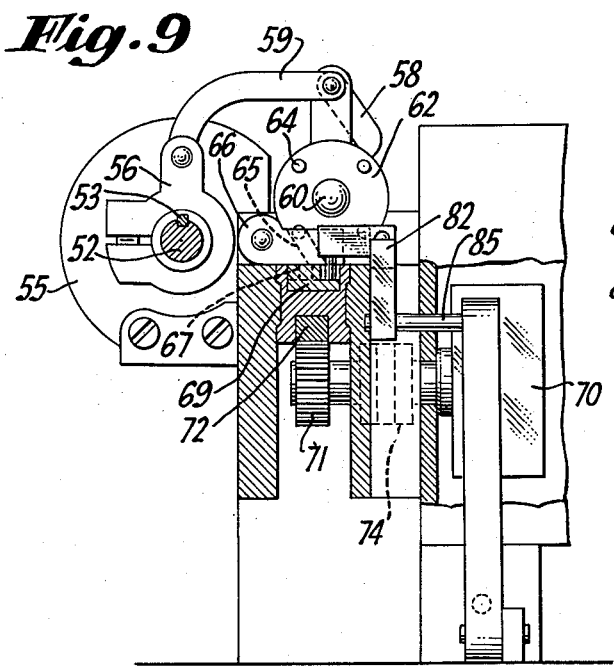
Figure 9 is an end elevation of the mechanism of Figure 8 partly in section.

Keyed to rotate with shaft 52, near hydraulic motor 55, but arranged to permit relative sliding motion with respect to the shaft is a crank 56 (Figs. 8, 9). Crank 56 is coupled to a ratchet and pawl mechanism 57, 58 by link 59. The oscillatory motion of crank 56 due to the motion of motor 55 causes pawl 58 to successively engage the teeth of ratchet wheel 57, thus rotating shaft 60. Shaft 60 carries a pin wheel 62 carrying a number of pins 64 extending from one face thereof. As wheel 62 rotates, the pins 64 in succession pass through cam slot 65 in escapement verge 66. The passage of pin 64 through the slot momentarily raises verge 66 and drops it again. The pallet pin 67 is thus momentarily freed from one of the slots 68 in escapement slide 69.

Figure 10:
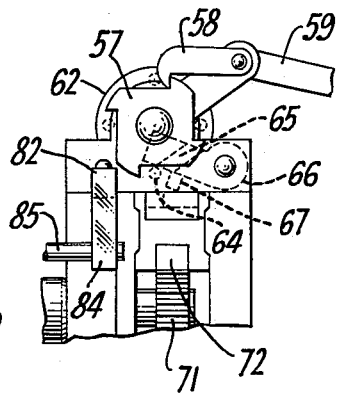
Figure 10 is a view of the portion shown in Figure 9 shown from the opposite direction.

Carriage 50 is arranged to be reciprocated back and forth along the length of chute 30 by means of a hydraulic rotary motor 70 coupled by gear 71 to a rack 72 on the bottom of the carriage 50. The upper side of carriage 50 carries the straight line escapement slide 69. When the machine is in operation the hydraulic motor 70 is continuously running in either one direction or the other and therefore applies a constant torque to gear wheel 71 through a friction clutch 74 shown in dotted lines in Figure 9. The lifting of pallet pin 67 from one of the slots 68 permits the motor 70 to move carriage 50 freely until the pallet pin drops into the next slot 68. The action causes the motion of the pickup head 45 from a position to drop a grid 10 into a pocket in one row of pockets in tray 19 into a position to drop the grid into the next pocket of the same row. Figure 10 shows more clearly the operation of the escapement pin 64. In this figure the pin is just on the point of passing out of slot 65 so that the pallet pin 67 is lifted out of slot 68 to permit the straight line escapement slide to operate.

The foregoing explanation has been predicated on the assumption that only one grid is to be placed in each pocket in tray 19. However, if for example, four grids are to be placed in any one pocket only one pin 64 need be placed on pinwheel 62 so that the escapement mechanism is tripped only for every fourth grid transferred. The ratchet and pawl mechanism may be modified in order to permit the placing of any number up to 20 grids in any one pocket of tray 19.

The escapement slide 69 also carries an elongated longitudinal slot 80. A trip pin 81 carried by a reversing slide 82 slides in slot 80. When the carriage 50 reaches each extreme of its motion over tray 19 one of the ends of slot 80 engages the pin 81 and shifts the reversing slide 82. The reversing slide 82 has turned down ends 84 (Fig. 3), which engage levers 85 to actuate a reversing valve at 86 (Figures 3 and 13) whereby the direction of rotation of motor 70 is reversed. Thus the direction of travel of grid pickup mechanism 38 is reversed at the end of each row of pockets in tray 19.

Figure 12:
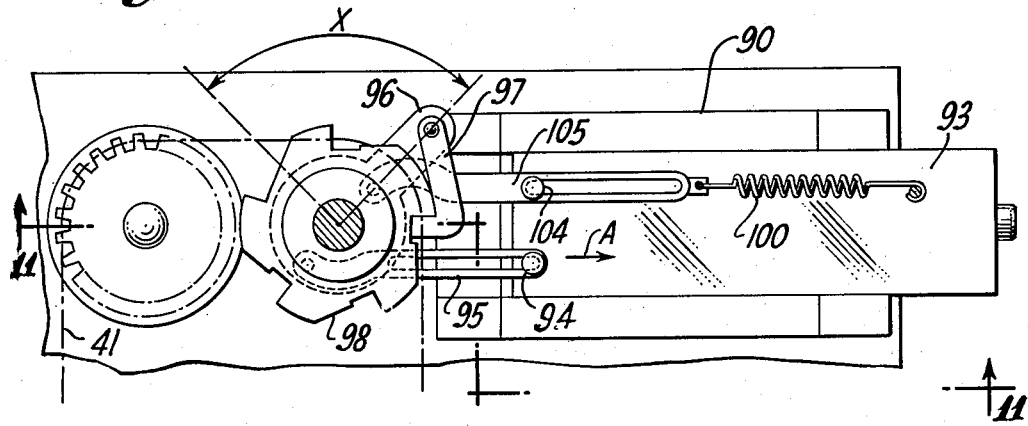
Figure 12 is a partial section taken along line 12—12 of Figure 11
Figure 11:
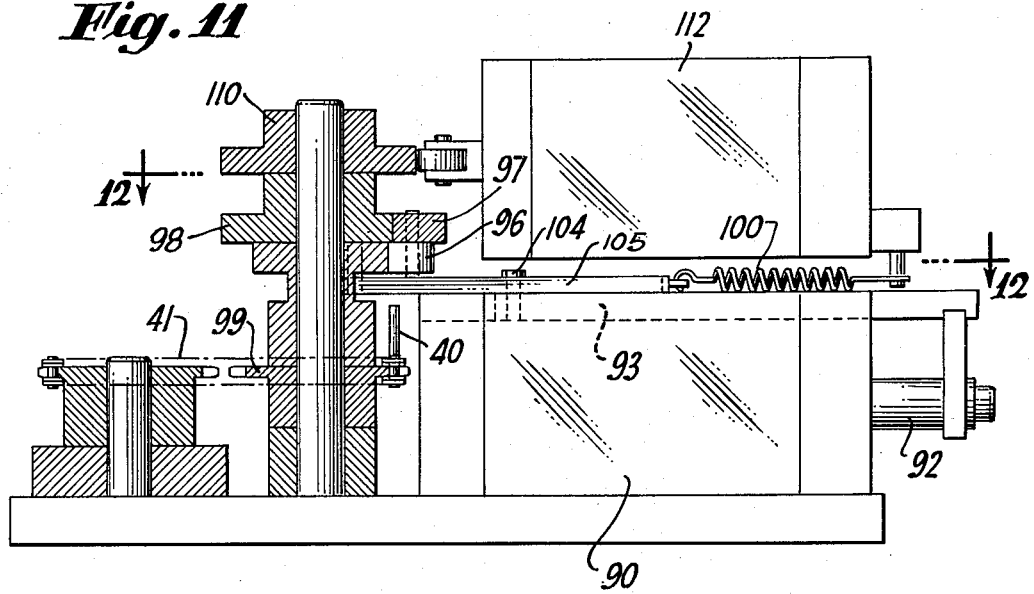

The operation of the hydraulic reversing valve 86 also applies pressure to one end or the other of a reciprocatory hydraulic motor 90, Figures 11, 12 and 13, to move plunger 92 from one end to the other. Plunger 92 is connected to a horizontal slide 93 mounted over motor 90. The operation of slide 93 to the right, for example, as indicated by arrow A, Fig. 12, causes pin 94 mounted thereon to drag on link 95, rotating pawl carrier 96 counterclockwise through the angle indicated as "x" in Figure 12. The rotation of the pawl carrier 96 drags pawl 97 around with its carrying ratchet wheel 98 and its associated sprocket wheel 99 with it through the same angle. At the end of the travel of slide 93 to the right, pins 94 and 104 are both at the extreme right end of slots in links 95 and 105. At the next reversal of hydraulic valve 86, plunger 92 and slide 93 are operated to the left. During the first half of the travel pin 94 tends to leave the right hand end of the slot in link 95 but is prevented from doing so by the tension of spring 100 on link 105. This causes pawl carrier 96 to rotate in a clockwise direction until pawl 97 can drop into the next notch in ratchet wheel 98. As the slide passes the midpoint in its travels pin 104 engages the left hand end of the slot in link 105 and again starts a counterclockwise rotation of pawl carrier 96 thus again indexing the sprocket wheel through angle "x". During the last movement the pin 94 and the link 95 had moved in opposite directions so that, at the end of the second indexing stroke, the pin 94 is at the left hand end of the slot in link 95. As the slide 93 is again reversed, the left hand end of the slot in link 105 will be pressed against the pin 104 by the spring 100, while the right hand end of the slot in link 95 and the pin 94 move toward each other until the position of Fig. 12 is reached, at which time pawl 97 is engaged with another notch in ratchet wheel 98. Further movement of slide 93 to the right, from the position shown in Fig. 12, repeats the cycle already described. The diameter of sprocket wheel 99 is such that it moves chain 41 and one of the pins carried by chain 41 a distance equal to the distance between the centers of two successive rows of pockets in one of the trays 19 when wheel 99 is moved through angle "x". Thus each reversal of the direction of travel of carriage 50 advances the trays 19 which are riding along rails 22, 23 so that the transfer head 38 discharges the grids into the next successive row of pockets.

It will be noted that one of the teeth on ratchet wheel 98 covers a greater arc than the others. This is so that when one tray is completely filled the next movement of sprocket 99 will move chain 41 far enough so that the first row of pockets in the next successive tray falls in the proper position for receiving grids deposited therein by transfer head 38. Rotation of sprocket 99 also causes rotation of a cam wheel 110 (Figures 2, 12 and 13). Cam wheel 110 is arranged to operate valve 112 to apply fluid pressure to motors 114 and 116 (Figure 13) for operating the mechanism for releasing a new tray from stack 20 to the rails 22, 23 and, in connection with stack 26, for picking up a loaded tray from the rails and inserting it at the bottom of the stack, thus clearing a space beneath stack 26 for the entry of the next succeeding tray. The mechanism by means of which one of the trays 19 will be released from stack 20 will now be more fully described by reference to Figures 1, 2, 5, and 6.

From Figure 2 it will be noted that rails 22 and 23 do not pass under the entire width of stack 20 but that a separate vertically reciprocable carriage 120 is provided thereunder having legs 122 and 123 of shape similar to the rails 22 and 23 and in its lowered position in alignment with these rails. Carriage 120 is arranged to be reciprocated between its lowered and raised positions by the operation of reciprocatory hydraulic motor 114 as indicated in Figure 5. As carriage 120 is lifted by motor 114, an elongated escapement pawl 124, passing along the entire width of stack 20, and pivoted to the base of the machine, is swung out of engagement with the lowermost of the trays 19 in stack 20, and pivoted to the base of the machine, is swung out of engagement with the lowermost of the trays 19 in stack 20 by the toggle action of lever 125. One end of toggle 125 is carried by escapement pawl 124 and the other by the vertically reciprocable carriage 120. The lift of the carriage 120 releases the right hand edge of tray 19 (Fig. 5). The other side of tray 19 is held by an escapement pawl 126. It is caused to release the edge of the tray upon downward motion of carriage 120 by spring biased finger 128 catching in a notch 129 carried by an adjustable latching plate 130 on escapement pawl 126. The upward motion of spring finger 128 into notch 129 does not lift escapement finger 126 far enough to release the tray but on the downward motion the spring finger catches in notch 129 and is rotated against the tension of spring 131 thus effectively increasing the arc of travel of escapement finger 126 enough to release the edge of tray 19. The downward motion of carriage 120 then carries the lowermost of the trays 19 into alignment with tracks 22 and 23 so that the next successive pin 40 carried by chain 41 engages it to move it along the tracks. The remaining trays are held in position on the ends of escapement fingers 124, 126. Figure 6 illustrates in detail how the spring biased finger 128, as it rotates in a clockwise direction due to its engagement with notch 129, causes the escapement finger 126 to move out far enough to clear the rim of the one of trays 19 which is to be released for movement along tracks 22, 23. Carriage 120 also carries a number of spring biased hooks 132 which in the uppermost position grasp the top edge of tray 19 and upon the lowering of carriage 120 positively carry the lowermost tray 19 along with the carriage so that if the lowermost tray should stick on to the bottom of the next tray 19 they will be positively separated.

The receiving stack 26 includes a vertically reciprocable carriage 220 similar to that just described above with regard to the empty tray stack. It likewise has side members 222 and 223 which in their lowermost position are in alignment with tracks 22 and 23. This carriage is vertically reciprocated by a hydraulic reciprocatory motor 116. Upward movement of carriage 220 in response to the energization of hydraulic motor 116 lifts the entire stack of trays so that spring biased fingers 230 engage the lip around the upper edge of the lowermost tray of the stack. Then when the carriage 220 returns to its lowered position the weight of the stack of trays is carried by the spring biased fingers.

In order to keep the stack of filled trays in proper alignment, vertical guides 226 are provided for the stack so that the likelihood of a stack of filled trays being spilled is decreased. When the stack of filled trays reaches the top of vertical guide members 226 the machine operator may remove them all as a unit for transferral to their desired location.

The hydraulic circuit diagram of Figure 13 shows an oil sump or reservoir 300, and a hydraulic pump 301 supplying pressure through a series of pipes 302, 303 and 304 to hydraulic valves 86, 310 and 112. Spent hydraulic fluid after having passed through motors 70, 55, 90, 114 and 116 is returned to the fluid sump through pipes 314, 316 and 318 from each of the said valves. A cam wheel 320 synchronously driven with respect to the cutoff operation of cutting head 15 of the grid machine GM operates hydraulic switch 310 to alternately apply hydraulic pressure to pipes 321 and 322 whereby the oscillatory hydraulic motor 55 is made to oscillate shaft 52 through angle A whereby the pickup head is operated. The one of pipes 321, 322 which is not, at any particular instant, connected to the hydraulic pressure line 303 is connected to the return line 316 whereby the spent fluid is returned to the hydraulic sump. Similarly the hydraulic switch 86 alternately connects the hydraulic pressure line 302 to either of pipes 323 and 324 whereby hydraulic motor 70 is caused to rotate in one direction or the other to drive carriage 50 along the length of chute 30 and also to operate hydraulic motor 90 for moving sprocket wheel 99 whereby the chain 41 is caused to advance the trays along track 22, 23.

While we have shown and particularly described an embodiment of the present invention, it should be distinctly understood that our invention is not limited thereto but that modification within the scope of the invention may be made.

This application is a continuation of our application filed November 25, 1949, bearing Serial No. 129,414, which has become abandoned.

What is claimed is:

1. An article handling device including a chute along which said articles pass, a stop for said articles in said chute and a pickup head with means to reciprocate the same from a position over said chute adjacent said stop, where one of said articles may be picked up, to a discharge position where said article is discharged and means for intermittently moving said stop and said pickup head along said chute whereby each article is discharged in a different position along said chute.

2. An article handling device including a chute along which said articles pass, a stop for said article in said chute and a pickup head with means to reciprocate the same from a position over said chute adjacent said stop, where one of said articles may be picked up, to a discharge position over a receiving tray where said article is dropped into said tray and means for intermittently moving said stop and said pickup head along said chute whereby each article is discharged in a different position along said chute.

3. An article handling device including a chute along which said articles pass, a stop in said chute and a pickup head having means for selectively picking up and releasing said articles, means for reciprocating said head from a position over said chute adjacent said stop, where one of said articles may be picked up, to a discharge position over a receiving tray where said article is dropped into said tray, said tray having a number of rows of pockets, means for moving said stop and head in a path along said chute so that a predetermined number of articles is dropped in succession into each pocket of a row, and means for intermittently moving said tray along a line transverse to said chute as said pickup head reaches each end of said path whereby the rows of pockets in said tray are filled in sequence.

4. An article handling device including a chute along which said articles pass, a stop in said chute and a pickup head having means for selectively picking up and releasing said articles, means for reciprocating said head from a position over said chute adjacent said stop, where one of said articles may be picked up, to a discharge position where said article is dropped, a pair of rails forming a track lying under said chute and along a line transverse to said chute, a stack of article receiving trays at one end of said track, means for moving a tray from said stack and intermittently along said track, said trays each containing a number of rows of article receiving pockets, the trays being intermittently moved a distance equal to the spacing between said rows of pockets, an escapement mechanism for moving said pickup head and said stop in a path along the chute whereby said pickup head reaches a discharge position over each of the pockets in a row in succession.

5. An article handling device including a chute along which said articles pass, a stop in said chute and a pickup head having means for selectively picking up and releasing said articles, means for reciprocating said head from a position over said chute adjacent said stop, where one of said articles may be picked up, to a discharge position where said article is dropped, a pair of rails forming a track lying under said chute and along a line transverse to said chute, a stack of article receiving trays at one end of said track, means for moving a tray from said stack and intermittently along said track, said trays each containing a number of rows of article receiving pockets, the trays being intermittently moved a distance equal to the spacing between said rows of pockets, an escapement mechanism for moving said pickup head and said stop in a path along the chute whereby said pickup head reaches a discharge position over each of the pockets in a row in succession, and means responsive to the arrival of said pickup head and at each end of a row for actuating the intermittent movement of said trays along said track.

6. An article handling device including a chute along which said articles pass, a stop in said chute and a pickup head having means for selectively picking up and releasing said articles, means for reciprocating said head from a position over said chute adjacent said stop, where one of said articles may be picked up, to a discharge position where said article is dropped, a pair of rails forming a track lying under said chute and along a line transverse to said chute, a stack of article receiving trays at one end of said track, means for moving a tray from said stack and intermittently along said track, said trays each containing a number of rows of article receiving pockets, the trays being intermittently moved a distance equal to the spacing between said rows of pockets, an escapement mechanism for moving said pickup head and said stop in a path along the chute whereby said pickup head reaches a discharge position over each of the pockets in a row in succession, and means responsive to the arrival of said pickup head at each end of a row for actuating the intermittent movement of said trays along said track and a tray stacking device at the other end of said track for placing filled trays in a stack one beneath the other.

7. In combination with a grid winding machine wherein separate complete grids are discharged one at a time from said machine, a chute for receiving said grids, a movable stop in said chute, means for moving said grids one at a time along said chute to said stop, a grid receiving tray under said chute and a pickup head having a suction nozzle for individually picking up said grids one at a time from said chute and transferring them to said tray, means for shifting the pickup head for effecting said transfer, said tray having a number of rows of individual grid receiving pockets therein and an intermittent escapement for moving said pickup head and stop whereby said grids are distributed in said pockets.

8. In combination with a grid winding machine wherein separate complete grids are discharged one at a time from said machine, a chute for receiving said grids, a movable stop in said chute, means for moving said grids one at a time along said chute to said stop, a grid receiving tray under said chute and a pickup head having a suction nozzle for individually picking up said grids one at a time from said chute and transferring them to said tray, means for shifting the pickup head for effecting said transfer, said tray having a number of rows of individual grid receiving pockets therein and an intermittent escapement for moving said pickup head and stop along said chute whereby said grids are distributed in said pockets and a feed for moving said tray intermittently under said chute so that each row of pockets is filled in sequence.

9. In combination with a grid winding machine wherein separate complete grids are discharged one at a time from said machine, a chute for receiving said grids, a movable stop in said chute, means for moving said grids one at a time along said chute to said stop, and a pickup head movable with said stop and having a suction nozzle thereon for picking up said grids individually, means for reciprocating said head from a position over said chute adjacent said stop to a discharge position where said grids are released.

10. In combination with a grid winding machine wherein separate complete grids are discharged one at a time from said machine, a chute for receiving said grids, a movable stop in said chute, means for moving said grids one at a time along said chute to said stop, and a pickup head having a suction nozzle thereon for picking up said grids individually, means for reciprocating said head from a position over said chute adjacent said stop to a discharge position where said grids are released, and an intermittent escapement for moving said pickup head and stop along the chute whereby said grids are distributed along the line of said chute.

11. In combination with a grid winding machine wherein separate complete grids are discharged one at a time from said machine, a chute along which said grids pass, a stop in said chute and a pickup head, means for reciprocating said head from a position over said chute adjacent said stop where one of said grids may be picked up to a discharge position where said grid is dropped, means on said head for selectively picking up and releasing said grids, a pair of rails forming a track lying under said chute and along a line transverse to said chute, a stack of grid receiving trays at one end of said track, means for moving a tray from said stack and intermittently along said track, said trays each containing a number of rows of grid receiving pockets, the trays being intermittently moved a distance equal to the spacing between said rows of pockets, an escapement mechanism for moving said pickup head and said stop in a path along the chute whereby said pickup head reaches a discharge position over each of the pockets in a row in succession, means responsive to the arrival of said pickup head at each end of a row for actuating the intermittent movement of said trays along said track and a tray stacking device at the other end of said track for placing filled trays in a stack one beneath the other.

12. In combination with a grid winding machine wherein separate complete grids are discharged one at a time from said machine, a chute along which said grids pass, a stop in said chute and a pickup head, means for reciprocating said head from a position over said chute adjacent said stop where one of said grids may be picked up to a discharge position where said grid is dropped, means on said head for selectively picking up and releasing said grids, a pair of rails forming a track lying under said chute and along a line transverse to said chute, means for moving a receiving tray intermittently along said track, said trays each containing a number of rows of grid receiving pockets, an escapement mechanism for moving said pickup head and said stop in a path along the chute whereby said pickup head reaches a discharge position over each of the pockets in a row in succession, and means responsive to the arrival of said pickup head and at each end of a row for actuating the intermittent movement of said trays along said track.

13. In combination with a grid winding machine wherein separate complete grids are discharged one at a time from said machine, a chute along which said grids pass, a stop in said chute and a pickup head, means for reciprocating said head from a position over said chute adjacent said stop, where one of said grids may be picked up, to a discharge position over a receiving tray where said grid is dropped into said tray, means on said head for selectively picking up and releasing said grids, said tray having a number of rows of pockets, means for moving said stop and head in a path along said chute so that a pre-determined number of grids is dropped in succession into each pocket of a row, and means for intermittently moving said tray along a line transverse to said chute as said pickup head reaches each end of said path whereby the rows of pockets in said tray are filled in sequence.

14. In combination with a grid winding machine wherein separate complete grids are discharged one at a time from said machine, a chute along which said grids pass, a stop in said chute and a pickup head, means for reciprocating said head from a position over said chute adjacent said stop, where one of said grids may be picked up to a discharge position where said grid is dropped, means on said head for selectively picking up and releasing said grids, a pair of rails forming a track lying under said chute and along a line transverse to said chute, a stack of grid receiving trays at one end of said track, means for moving a tray from said stack and intermittently along said track, said trays each containing a number of rows of grid receiving pockets, the trays being intermittently moved a distance equal to the spacing between said rows of pockets, an escapement mechanism for moving said pickup head and said stop in a path along the chute whereby said pickup head reaches a discharge position over each of the pockets in a row in succession.

15. An article handling device including a chute along which said articles pass, a stop in said chute and a pickup head, means for reciprocating said head from a position over said chute adjacent said stop, where one of said articles may be picked up, to a discharge position where said article is dropped, means on said head for selectively picking up and releasing said article, a pair of rails forming a track lying under said chute and along a line transverse to said chute, a stack of article receiving trays at one end of said track, means for moving a tray from said stack and intermittently along said track, said trays each containing a number of rows of article receiving pockets, the trays being intermittently moved a distance equal to the spacing between said rows of pockets, an escapement mechanism for moving said pickup head and said stop in a path along the chute whereby said pickup head reaches a discharge position over each of the pockets in a row in succession, said escapement mechanism including a carriage for said pickup head movable on a track along said chute, a reversible motor for selectively urging said carriage in either direction along said track, means for stopping said carriage at each position where said pickup head discharges over a pocket, means responsive to the reciprocation of said head for regularly releasing said stopping means.

16. In combination with a grid winding machine wherein separate grids are discharged one at a time from said machine, a chute along which said grids pass, a stop in said chute and a pickup head, means for reciprocating said head from a position over said chute adjacent said stop, where one of said grids may be picked up to a discharge position where said grid is dropped, means on said head for selectively picking up and releasing said grid, a pair of rails forming a track lying under said chute and along a line transverse to said chute, a stack of grid receiving trays at one end of said track, means for moving a tray from said stack and intermittently along said track, said trays each containing a number of rows of grid receiving pockets, the trays being intermittently moved a distance equal to the spacing between said rows of pockets, an escapement mechanism for moving said pickup head and said stop in a path along the chute whereby said pickup head reaches a discharge position over each of the pockets in a row in succession, said escapement mechanism including a carriage for said pickup head movable on a track along said chute, a reversible motor for selectively urging said carriage in either direction along said track, means for stopping said carriage at each position where said pickup head discharges over a pocket, means responsive to the reciprocation of said head for regularly releasing said stopping means.

17. An article handling device including a chute along which said articles pass, a stop in said chute and a pickup head, means for reciprocating said head from a position over said chute adjacent said stop, where one of said articles may be picked up, to a discharge position where said article is dropped, means on said head for selectively picking up and releasing said article, a pair of rails forming a track lying under said chute and along a line transverse to said chute, a stack of article receiving trays at one end of said track, means for moving a tray from said stack and intermittently along said track, said trays each containing a number of rows of article receiving pockets, the trays being intermittently moved a distance equal to the spacing between said rows of pockets, an escapement mechanism for moving said pickup head and said stop in a path along the chute whereby said pickup head reaches a discharge position over each of the pockets in a row in succession, said escapement mechanism including a carriage for said pickup head movable on a track along said chute, a reversible motor for selectively urging said carriage in either direction along said track, means for stopping said carriage at each position where said pickup head discharges over a pocket, means responsive to the reciprocation of said head for regularly releasing said stopping means, and means responsive to the arrival of said carriage at either end of said track for reversing said motor.

18. In combination with a grid winding machine wherein separate complete grids are discharged one at a time from said machine, a chute along which said grids pass, a stop in said chute and a pickup head, means for reciprocating said head from a position over said chute adjacent said stop, where one of said grids may be picked up to a discharge position where said grid is dropped, means on said head for selectively picking up and releasing said grids, a pair of rails forming a track lying under said chute and along a line transverse to said chute, a stack of grid receiving trays at one end of said track, means for moving a tray from said stack and intermittently along said track, said trays each containing a number of rows of grid receiving pockets, the trays being intermittently moved a distance equal to the spacing between said rows of pockets, an escapement mechanism for moving said pickup head and said stop in a path along the chute whereby said pickup head reaches a discharge position over each of the pockets in a row in succession, said escapement mechanism including a carriage for said pickup head movable on a track along said chute, a reversible motor for selectively urging said carriage in either direction along said track, means for stopping said carriage at each position where said pickup head discharges over a pocket, means responsive to the reciprocation of said head for regularly releasing said stopping means, and means responsive to the arrival of said carriage at either end of said track for reversing said motor.

19. An article handling device including a chute along which said articles pass, a stop in said chute and a pickup head, means for reciprocating said head from a position over said chute adjacent said stop, where one of said articles may be picked up, to a discharge position where said article is dropped, means on said head for selectively picking up and releasing said article, a pair of rails forming a track lying under said chute and along a line transverse to said chute, a stack of article receiving trays at one end of said track, means for moving a tray from said stack and intermittently along said track, said trays each containing a number of rows of article receiving pockets, the trays being intermittently moved a distance equal to the spacing between said rows of pockets, an escapement mechanism for moving said pickup head and said stop in a path along the chute whereby said pickup head reaches a discharge position over each of the pockets in a row in succession, said escapement mechanism including a carriage for said pickup head movable on a track along said chute, a reversible motor for selectively urging said carriage in either direction along said track, means for stopping said carriage at each position where said pickup head discharges over a pocket, means responsive to the reciprocation of said head for regularly releasing said stopping means, and means responsive to the arrival of said carriage at either end of said track for reversing said motor, said last mentioned means also actuating the tray moving means.

20. In combination with a grid winding machine wherein separate complete grids are discharged one at a time from said machine, a chute along which said grids pass, a stop in said chute and a pickup head, means for reciprocating said head from a position over said chute adjacent said stop, where one of said grids may be picked up to a discharge position where said grid is dropped, means on said head for selectively picking up and releasing said grids, a pair of rails forming a track lying under said chute and along a line transverse to said chute, a stack of grid receiving trays at one end of said track, means for moving a tray from said stack and intermittently along said track, said trays each containing a number of rows of grid receiving pockets, the trays being intermittently moved a distance equal to the spacing between said rows of pockets, an escapement mechanism for moving said pickup head and said stop in a path along the chute whereby said pickup head reaches a discharge position over each of the pockets in a row in succession, said escapement mechanism including a carriage for said pickup head movable on a track along said chute, a reversible motor for selectively urging said carriage in either direction along said track, means for stopping said carriage at each position where said pickup head discharges over a pocket, means responsive to the reciprocation of said head for regularly releasing said stopping means, and means responsive to the arrival of said carriage at either end of said track for reversing said motor, said last mentioned means also actuating the tray moving means.

21. A transfer mechanism including a pickup head having a suction nozzle, a carriage and a pair of parallel links pivoted to said head and to said carriage, a motor for oscillating one of said links whereby said head is oscillated from one position to another, one of said positions being adjacent a stop carried by said carriage and in a chute along which said carriage runs and the other being outside of said chute, a reversible motor urging said carriage along said track in one direction or the other, means for intermittently blocking the motion of said carriage and means responsive to a predetermined number of oscillations of said head for momentarily releasing said blocking means whereby said carriage is indexed along said track.

22. A transfer mechanism including a pickup head having a suction nozzle, a carriage and a pair of parallel links pivoted to said head and to said carriage, a motor for oscillating one of said links whereby said head is oscillated from one position to another, one of said positions being adjacent a stop carried by said carriage and in a chute along which said carriage runs and the other being outside of said chute, a reversible motor urging said carriage along said track in one direction or the other, means for intermittently blocking the motion of said carriage and means responsive to a predetermined number of oscillations of said head for momentarily releasing said blocking means whereby said carriage is indexed along said track, and means responsive to the arrival of said carriage at each end of said track for reversing said reversible motor.

23. In combination with a grid winding machine wherein separate complete grids are discharged one at a time from said machine, a chute along which said grids pass, a stop in said chute and a pickup head, means for reciprocating said head from a position over said chute adjacent said stop where one of said grids may be picked up to a discharge position where said grid is dropped, means on said head for selectively picking up and releasing said grids, a pair of rails forming a track lying under said chute and along a line transverse to said chute, means for moving a receiving tray intermittently along said track, said trays each containing a number of rows of grid receiving pockets, an escapement mechanism for moving said pickup head and said stop in a path along the chute whereby said pickup head reaches a discharge position over each of the pockets in a row in succession, the means for moving said trays including a chain running under said track having spaced tray engaging pins along it, a ratchet wheel coupled to a sprocket engaging said chain, a pawl arranged to oscillate about the axis of said wheel, and means for causing said pawl to perform one oscillation in response to the arrival of said pickup head at each end of a row, whereby said trays are indexed along said track.

24. An article handling device including a conveyor having a path along which said articles move, an article receiving device having article receiving areas arranged longitudinally and transversely of said device, an article transfer element of a size and positioned to pick up only one article at a time from said path and convey it to an area on the receiving device, means connected to said element for energizing and deenergizing the same, said deenergization means operating to release an article from the element at each area, and means to effect relative shifting of the article transfer element and the article receiving device longitudinally and transversely of the transfer element so that all article receiving areas of the receiving device will be reached by the article transfer element.

25. An article handling device including a conveyor having a path along which said articles move, an article receiving device having article receiving areas arranged longitudinally and transversely of said device, an article transfer element including an article engaging suction nozzle of a size and positioned to pick up only one article at a time from said path and convey it to an area on the receiving device, means, forming a permanent part of the element, to release an article from the element by cutting off the suction at each area, and means to effect relative shifting of the article transfer element and the article receiving device longitudinally and transversely of the transfer element so that all article receiving areas of the receiving device will be reached by the article transfer element.

26. In an article handling device, means for conveying articles along a definite path, means for moving a receiver having rows of compartments along a definite path, a transfer element having a pick-up portion of a size to pick up only one article at a time from said first path, said pick-up portion being reciprocative between the two paths, means connected to said pick-up portion to render said pick-up portion effective when it is over the first path to pick up an article and ineffective when the same is over the second path in order that the pick-up portion may release said article, means to effect motion of the receiver and of the pick-up portion to cause every compartment in a row of the receiver to be positioned, one by one, under said pick-up portion, and means to shift the receiver preparatory to filling another row of said receiver.

References Cited in the file of this patent

UNITED STATES PATENTS 2,280,854    Rooney _____ Apr. 28, 1942